US011279066B2

(12) United States Patent
Stricher et al.

(10) Patent No.: US 11,279,066 B2
(45) Date of Patent: Mar. 22, 2022

(54) ENCAPSULATION METHOD

(71) Applicant: SAINT-GOBAIN GLASS FRANCE, Courbevoie (FR)

(72) Inventors: Arthur Stricher, Margny les Compiegne (FR); Fabienne Piroux, Compiegne (FR); Christophe Kleo, Attichy (FR); Bastien Grandgirard, Marqueglise (FR); Olivier Blanc, Tracy le Mont (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 3 days.

(21) Appl. No.: 16/488,089

(22) PCT Filed: Feb. 23, 2018

(86) PCT No.: PCT/FR2018/050434
§ 371 (c)(1),
(2) Date: Aug. 22, 2019

(87) PCT Pub. No.: WO2018/154251
PCT Pub. Date: Aug. 30, 2018

(65) Prior Publication Data
US 2020/0061889 A1    Feb. 27, 2020

(30) Foreign Application Priority Data

Feb. 27, 2017   (FR) ..................................... 17 51577

(51) Int. Cl.
| | | |
|---|---|---|
| *B29C 45/14* | (2006.01) | |
| *B29C 45/00* | (2006.01) | |
| *B29K 21/00* | (2006.01) | |
| *B29K 705/00* | (2006.01) | |
| *B29K 709/08* | (2006.01) | |
| *B29L 31/30* | (2006.01) | |
| *B60J 1/00* | (2006.01) | |

(52) U.S. Cl.
CPC .... *B29C 45/14377* (2013.01); *B29C 45/0001* (2013.01); *B29C 45/14434* (2013.01); *B29C 45/14467* (2013.01); *B29C 2045/14459* (2013.01); *B29K 2021/003* (2013.01); *B29K 2705/00* (2013.01); *B29K 2709/08* (2013.01); *B29L 2031/30* (2013.01); *B60J 1/00* (2013.01)

(58) Field of Classification Search
None
See application file for complete search history.

(56) References Cited

U.S. PATENT DOCUMENTS

| | | | | |
|---|---|---|---|---|
| 4,834,931 | A | * 5/1989 | Weaver | ............. B29C 45/14377 264/252 |
| 5,069,852 | A | * 12/1991 | Leone | ................... B29C 70/845 264/239 |
| 5,344,603 | A | * 9/1994 | Jardin | ............... B29C 45/14377 264/252 |
| 5,997,793 | A | * 12/1999 | Lahnala | ............ B29C 45/14377 264/252 |
| 6,497,337 | B1 | * 12/2002 | Kehe | ........................ C09K 3/10 156/307.5 |
| 2005/0145630 | A1 | * 7/2005 | Williams | ............. B65D 17/502 220/359.3 |
| 2006/0237870 | A1 | 10/2006 | Bordeaux et al. | |
| 2010/0104803 | A1 | * 4/2010 | Nakagawa | ............... B60J 1/006 428/138 |
| 2012/0221022 | A1 | * 8/2012 | Devens, Jr. | ........ A61B 17/0482 606/144 |
| 2014/0178635 | A1 | * 6/2014 | Imaizumi | ................ B32B 27/36 428/138 |
| 2015/0367605 | A1 | 12/2015 | Morikawa et al. | |
| 2017/0130043 | A1 | 5/2017 | Thimonier | |
| 2018/0229263 | A1 | * 8/2018 | Nishikori | ............... B05D 3/107 |
| 2020/0316912 | A1 | * 10/2020 | Hirano | .................. C09D 5/084 |

FOREIGN PATENT DOCUMENTS

| | | |
|---|---|---|
| CN | 104470717 A | 3/2015 |
| FR | 2 856 003 A1 | 12/2004 |
| WO | WO 2014/111978 A1 | 7/2014 |
| WO | WO 2015/145021 A1 | 10/2015 |

OTHER PUBLICATIONS

International Search Report dated Apr. 16, 2018 in PCT/FR2018/050434 filed on Feb. 23, 2018.

* cited by examiner

Primary Examiner — Edmund H Lee
(74) Attorney, Agent, or Firm — Oblon, McClelland, Maier & Neustadt, L.L.P.

(57) ABSTRACT

A process is for manufacturing a complex motor vehicle glazing including a glass pane, an elastomer seal and a metal insert overmolded by the elastomer seal. The process includes inserting an edge of a glass pane and a metal insert into an encapsulation mold forming a leaktight cavity around the edge of the glass pane, filling the leaktight cavity containing the edge of the glass pane and the metal insert, by injecting an encapsulation composition including a polypropylene (PP)/thermoplastic elastomer (TPE) compound in the molten state, cooling the encapsulation composition to form an elastomer seal in which the metal insert is integrated, and releasing the elastomer seal from the mold. The PP/TPE compound includes from 30% to 80% by weight of polypropylene (PP) and the metal insert is covered over its entire surface liable to come into contact with the encapsulation composition, with a polypropylene coating.

19 Claims, No Drawings

ENCAPSULATION METHOD

The present invention relates to a process for manufacturing a complex motor vehicle glazing, preferably a glazed roof, comprising a step of encapsulation via injection of a fluidized thermoplastic elastomer into an encapsulation mold containing a large-sized metal insert.

In the industrial field of motor vehicle glazings, the term "encapsulation" denotes a process or a step of overmolding a polymer material around the perimeter of a glass pane. An encapsulation composition containing the polymer material or precursors of the polymer material, is injected in the relatively viscous fluid state into a mold forming a leaktight cavity around the edge of the glass pane. After curing the composition, by cooling or crosslinking, the mold is opened and removed, leaving at the periphery of the glass pane a profiled bead in contact with the edge face and with at least one of the two faces of the glass pane.

The cured polymer that forms the profiled bead is often an elastomer capable of acting as a seal between the glazing and the body.

The elastomers most commonly used as encapsulation material for the manufacture of glazed motor vehicle roofs are polyurethanes obtained by reaction injection molding (RIM). The precursors, monomers or oligomers, generally polyols and polyisocyanates, are injected in to the mold, where they react to form a crosslinked three-dimensional network.

RIM encapsulation is particularly suitable, in particular for the manufacture of complex motor vehicle glazings, such as glazed roofs, comprising not only a glass pane and an elastomer seal, but also large-sized metal inserts that act as mechanical reinforcement. These complex motor vehicle glazings may further comprise other parts, partially or completely incorporated into the encapsulation, such as centering pins or side brackets.

The RIM encapsulation composition, owing to its very great fluidity, perfectly fills even the hard to reach locations of the mold cavity. Furthermore, the adhesion of the crosslinked polyurethane to the surface of the metal insert, generally protected against corrosion by a paint applied by cataphoresis, is excellent.

The use of thermoplastic polymers and in particular of thermoplastic elastomers (TPEs) for the encapsulation of motor vehicle glazings constitutes a very advantageous alternative to the thermoset elastomers obtained by RIM.

Motor vehicle glazing seals based on TPE are in fact recyclable, which is not the case for seals based on RIM polyurethanes. Furthermore, the use of TPE takes away the problems linked to the use of reactive and toxic volatile monomers such as isocyanates.

The manufacture of seals from thermoplastic elastomers has already been successfully implemented for the encapsulation of simple motor vehicle glazings of relatively modest size, such as rear quarter windows.

For the encapsulation of motor vehicle glazings of larger size, and in particular for motor vehicle glazings, such as roofs, comprising overmolded metal inserts that have a mechanical reinforcement role, the use of TPE remains problematic and to date has not been considered on the industrial scale.

One of the technical problems with which a person skilled in the art is confronted when he/she uses TPE-based encapsulation compositions for manufacturing seals of complex glazings with large-sized inserts is that of obtaining insufficient adhesion of the TPE to the surface of the metal insert. These metal inserts, for example profiled elements having a length of several tens of centimetres, are generally coated with a paint deposited by cataphoresis. This paint, generally consisting of a thermoset cationic polymer, has no particular affinity for a thermoplastic polymer. The insufficient adhesion between insert and the thermoplastic seal could result in a partial or complete delamination, then the loss of the integrity of the glazing.

The present invention is based on the idea of improving the adhesion between the TPE seal and the insert by using inserts precoated with a layer of polypropylene and by using, as thermoplastic elastomer material, a compound of a TPE and of polypropylene (TPE/PP compound). The TPE/PP compound injected at high temperature sufficiently softens the polypropylene of the insert so that the polypropylene chains of the two components can interpenetrate and form a solid connection.

The subject of the present invention is therefore a process for manufacturing a complex motor vehicle glazing comprising a glass pane, an elastomer seal and a metal insert overmolded by the elastomer seal, comprising
  inserting the edge of a glass pane and a metal insert into an encapsulation mold forming a leaktight cavity around the edge of the glass pane,
  filling the leaktight cavity containing the edge of the glass pane and the metal insert, by injecting an encapsulation composition comprising a polypropylene (PP)/thermoplastic elastomer (TPE) compound in the molten state,
  cooling the encapsulation composition so as to form an elastomer seal wherein the metal insert is integrated,
  releasing the elastomer seal, wherein the metal insert is integrated, from the mold,
the process being characterized in that said PP/TPE compound comprises from 30% to 80% by weight, preferably from 40% to 75% by weight and in particular from 45% to 70% by weight of polypropylene (PP), and in that the metal insert is covered over the entire surface thereof liable to come into contact with the encapsulation composition, with a polypropylene coating.

The glass pane to be encapsulated may be a glass pane made of mineral glass or else made of plastic. It may consist of a single sheet of glass or of plastic or else be formed of two or more than two sheets of glass or of plastic, bonded to one another by means of what is conventionally referred to as a lamination interlayer, generally consisting of poly(vinyl butyral) (PVB) or of poly(ethylene-vinyl acetate) copolymer (EVA).

The sheet or sheets of glass and the lamination interlayer may be colored, but the glass pane as a whole retains a certain transparency, with a light transmission (LT) that is preferably between 10% and 50%, and in particular between 15% and 40%.

In one preferred embodiment of the process of the invention, the glass pane is a laminated glass pane consisting of two sheets of mineral glass bonded to one another by means of a lamination interlayer.

As explained in the introduction, the process of the present invention is particularly useful for glass panes that have quite large dimensions, that can be used in complex glazings such as motor vehicle glazed roofs.

The dimensions of the glass pane are preferably such that its perimeter is at least equal to 1 m, preferably between 1.0 m and 8.0 m, in particular between 1.3 and 4.5 m, ideally between 1.5 and 4.0 m.

The metal insert introduced into the encapsulation mold before the injection of the encapsulation composition preferably has quite large dimensions, for example a length similar to one of the dimensions of the glass pane, for example a length of between 10 cm and 1.5 m, in particular between 15 and 1.2 m.

The surface area of the metal insert capable of coming into contact with the encapsulation composition is typically a surface area of several tens of square centimeters, or even of several hundred square centimeters, in particular between 10 cm$^2$ and 1000 cm$^2$. The process of the present invention may of course be used for inserts of smaller size having a contact area of less than 10 cm$^2$, but it would be less useful since it is not very likely that a possible delamination between the surface of the insert and the overmolded seal would result in a loss of integrity of the glazing.

The term "thermoplastic elastomer (TPE)" denotes heterogeneous polymer materials comprising rigid (or hard) domains and flexible (or soft) domains. These materials display elastomeric behavior in a limited range of temperatures encompassing room temperature, and at temperatures above the softening point of the rigid domains they adopt plastic behavior and may consequently be used as thermoplastic polymers.

Thermoplastic elastomers are known and their nomenclature and classification are defined in standard ISO 18064.

The thermoplastic elastomers used for the process according to the invention are preferably selected from the group consisting of the following polymers:
  unvulcanized ethylene-propylene-diene monomer (EPDM) rubber,
  partially vulcanized ethylene-propylene-diene monomer (EPDM) rubber, and
  styrene thermoplastic elastomers (TPE-S) such as poly(styrene-b-butadiene-b-styrene) block copolymers (SBS), poly(styrene-b-(ethylene-butylene)-b-styrene) block copolymers (SEBS) and poly(styrene-b-(ethylene-propylene)-b-styrene) block copolymers (SEPS).

When these TPEs are mixed with polypropylene, the TPE/PP compound obtained also has thermoplastic elastomer properties, i.e. elastic behavior in a certain temperature range encompassing room temperature (20° C.) and thermoplastic behavior beyond this temperature range.

Polypropylene does not only improve the adhesion between the overmolded seal and the metal insert, but also advantageously increases the Shore A hardness of the seals obtained.

The encapsulation composition used in the process of the invention contains, in addition to the TPE/PP compound, one or more additives which mainly have the role of reducing the viscosity of the encapsulation composition at high temperature, of lowering the costs of the final material obtained, and/or of increasing the physical or chemical stability of the final material obtained.

The cost-lowering additives are for example mineral fillers such as chalk, kaolin, talc, zinc oxide and carbon black. They may be present in an amount typically of between 1% and 15%, preferably between 2% and 10% by weight, relative to the total weight of the encapsulation composition. The presence of such mineral fillers increases the Shore A hardness of the seals formed.

Oils, preferably mineral oils, serve as processing aids and make it possible to lower the glass transition temperature and increase the fluidity of the hot encapsulation composition. They are present for example in a proportion of from 10% to 50%, preferably from 20% to 45% by weight, relative to the total weight of the encapsulation composition. Their presence has little effect on the hardness of the final seal.

Finally, antioxidant or UV stabilizers may also be present in a small amount, generally less than 1% by weight.

The total amount of such additives must not, however, exceed an upper limit of about 30% to 35% by weight and the encapsulation composition preferably comprises between 35% and 65% by weight, preferably between 45% and 60% by weight, and in particular between 50% and 57% by weight of PP/TPE compound, relative to the total weight of the encapsulation composition.

Ready-to-use encapsulation compositions containing a PP/TPE compound and additives (mineral oils/mineral fillers/stabilizers) are available on the market from TEKNOR APEX, EXXON, KRAIBURG, MCPP, MULTIBASE.

The encapsulation composition is preferably injected at a temperature of between 170° C. and 260° C., in particular between 170° C. and 220° C., under a pressure of between 15 bar and 120 bar, preferably between 15 bar and 80 bar.

The "curing" of the encapsulation composition is carried out by simple active or passive cooling, preferably active cooling, of the mold and of the encapsulation material. In other words, the curing step does not comprise a heating step for chemical crosslinking of the encapsulation composition.

The seal is advantageously released from the mold before complete cooling to room temperature, for example at a temperature between 40 120° C.

The overmolded metal inserts may be made of any metal material. They are preferably made of steel. They may optionally be covered with an organic or mineral surface coating, such as for example a cataphoretically-deposited layer of paint, which effectively protects them against corrosion.

The polypropylene coating of the metal inserts may therefore be in direct contact with the metal surface or else may be deposited on the cataphoretically-deposited layer of paint. The thickness of the polypropylene coating is advantageously between 0.1 and 5 mm, preferably between 0.5 and 4 mm, and in particular between 1 and 3 mm, these ranges not encompassing the thickness of a possible cataphoretically-deposited layer of paint. The polypropylene coating may be deposited for example in the form of powder paint which, under the action of heat, is converted into a film.

The polypropylene coating advantageously consists of at least 95% by weight, preferably at least 98% by weight and ideally 100% by weight of polypropylene. In particular it is preferably free of mineral fillers.

The invention claimed is:

1. A process for manufacturing a complex motor vehicle glazing comprising a glass pane, an elastomer seal, and a metal insert, optionally covered with a cataphoretically-deposited layer of paint, overmolded by the elastomer seal, comprising:
  inserting an edge of a glass pane and a metal insert having a surface into an encapsulation mold forming a leaktight cavity around the edge of the glass pane, wherein the metal insert is covered with a polypropylene coating, wherein the polypropylene coating (1) consists of at least 95% by weight of the coating of polypropylene, (2) has a thickness of between 1 and 5 mm, (3) is in direct contact with the surface of the metal insert or is in direct contact with the cataphoretically-deposited layer of paint, if present, and (4) is over the entire surface of the metal insert liable to come into contact with an encapsulation composition prior to insertion of the metal insert into the encapsulation mold, filling the leaktight cavity containing the edge of the glass pane and the metal insert covered with a polypropylene coating, by injecting an encapsulation composition comprising a polypropylene (PP)/thermoplastic elastomer (TPE) compound in the molten state, cooling the injected, molten encapsulation composition so as to form an elastomer seal, wherein the metal insert covered with a polypropylene coating is integrated in the elastomer seal, and releasing the elastomer seal, wherein the metal insert covered with a polypropylene coating is integrated in the elastomer seal, from the mold, wherein said PP/TPE compound comprises from 30% to 80% by weight of polypropylene (PP).

2. The process as claimed in claim 1, wherein the surface area of the metal insert covered with a polypropylene coating liable to come into contact with the encapsulation composition is between 10 cm$^2$ and 1000 cm$^2$.

3. The process as claimed in claim 1, wherein the TPE is chosen from
unvulcanized ethylene-propylene-diene monomer (EPDM) rubber,
partially vulcanized ethylene-propylene-diene monomer (EPDM) rubber, and
styrene thermoplastic elastomers (TPE-S).

4. The process as claimed in claim 1, wherein the encapsulation composition further comprises at least one selected from the group consisting of mineral fillers, processing aids, antioxidants and UV stabilizers.

5. The process as claimed in claim 1, wherein the encapsulation composition comprises between 35% and 65% by weight of PP/TPE compound, relative to the total weight of the encapsulation composition.

6. The process as claimed in claim 1, wherein the encapsulation composition is injected at a temperature of between 170° C. and 260° C., under a pressure of between 15 bar and 120 bar.

7. The process as claimed in claim 1, wherein the cooling the fluid encapsulation composition is carried out by active cooling of the encapsulation mold.

8. The process as claimed in claim 1, wherein said PP/TPE compound comprises from 45% to 70% by weight of polypropylene (PP).

9. The process as claimed in claim 1, wherein the polypropylene coating covering the metal insert has a thickness of between 1 and 3 mm.

10. The process as claimed in claim 9, wherein said PP/TPE compound comprises from 45% to 70% by weight of polypropylene (PP).

11. The process as claimed in claim 9, wherein the encapsulation composition comprises between 50% and 57% by weight of PP/TPE compound, relative to the total weight of the encapsulation composition.

12. The process as claimed in claim 1, wherein the encapsulation composition comprises between 50% and 57% by weight of PP/TPE compound, relative to the total weight of the encapsulation composition.

13. The process as claimed in claim 1, wherein the encapsulation composition is injected at a temperature of between 170° C. and 220° C., under a pressure of between 15 bar and 80 bar.

14. The process as claimed in claim 1, wherein the polypropylene coating consists of at least 98% by weight of the coating of polypropylene.

15. The process as claimed in claim 14, wherein said PP/TPE compound comprises from 45% to 70% by weight of polypropylene (PP).

16. The process as claimed in claim 1, wherein the polypropylene coating consists of polypropylene.

17. The process as claimed in claim 16, wherein the encapsulation composition comprises between 50% and 57% by weight of PP/TPE compound, relative to the total weight of the encapsulation composition.

18. The process as claimed in claim 1, wherein the polypropylene coating is in direct contact with the metal surface.

19. The process as claimed in claim 1, wherein a cataphoretically-deposited layer of paint is present on the metal insert and the polypropylene coating is in direct contact with the cataphoretically-deposited layer of paint.

* * * * *